WAVE SIGNAL RECEIVER

Filed March 28, 1967 3 Sheets-Sheet 1

Inventor
Fleming Dias
By Francis W. Crotty
Attorney

Inventor
Fleming Dias
By Francis W. Crotty
Attorney

Nov. 18, 1969 F. DIAS 3,479,463

WAVE SIGNAL RECEIVER

Filed March 28, 1967 3 Sheets-Sheet 3

Inventor
Fleming Dias
By Francis W. Crotty
Attorney

United States Patent Office 3,479,463
Patented Nov. 18, 1969

3,479,463

WAVE SIGNAL RECEIVER

Fleming Dias, Chicago, Ill., assignor to Zenith Radio Corporation, Chicago, Ill., a corporation of Delaware Filed Mar. 28, 1967, Ser. No. 626,482
Int. Cl. H03d 9/00
U.S. Cl. 179—15 11 Claims

ABSTRACT OF THE DISCLOSURE

Receivers for NTSC compatible color television and F.C.C. approved stereo-FM transmissions having detectors for the subcarrier modulation components of these transmissions which detectors do not employ any filter networks but still effectively reject substantially all input information other than the subcarrier information to be detected. A pair of detector transistors share a common load impedance across which the detected information is developed in the same phase by both transistors while all other signal components applied to the transistors are developed in an opposite phase and cancel across this load. The detector transistors are preferably of complementary symmetry. Five embodiments are illustrated; others are discussed.

BACKGROUND OF THE INVENTION

The present invention is directed generally to synchronous detectors and, more particularly, to new and improved signal balanced detectors of the foregoing type which are especially well-suited for integrated circuit applications. The attributes of the invention are particularly manifest in stereophonic FM and color television receivers, and accordingly, the invention will be described in both contexts.

Under presently accepted F.C.C. standards, the modulation components of a stereophonic transmission comprise an audio sum signal component $(L+R)$, a difference signal component $(L-R)$ present as amplitude modulation of a suppressed-subcarrier, and a pilot tone used to synchronize receiver instruments in the demodulation of the difference signal component. The stereophonically related L and R audio signals may be separately developed at the receiver by any one of several known circuit constructions. According to one conventional technique, the difference signal modulation is selected from the composite signal by means of a bandpass filter and this singular component is synchronously demodulated and is developed in opposite polarities by a conventional phase splitter. The audio sum signal is translated in a different channel to a matrix wherein it is individually combined with each polarity of the demodulated difference signal to develop the stereo signals separate from one another. In addition to the bandpass filter just described, conventional stereo receivers also include a trap for bypassing a 67 kHz. subcarrier frequency band which is present in some stereo transmissions and 38 kHz. distributed notch filters or the like for bypassing the stereo reference or synchronizing signal. The subcarrier band, which is frequency modulated, is used for Subsidiary Communications Authorization transmissions, a subscription background music service authorized by the Federal Communications Commission. Quality reproduction dictates the presence of the trap and distributed filters as annoying audio interference otherwise results from the heterodyning of these signals with remaining signal components.

The distributed notch filters, the SCA trap circuit and the bandpass filter network are all relatively expensive even in discrete component form. However, with integrated circuits such filters and traps are not only expensive, they are extremely difficult to create because of limitations on component values and types currently existing in this art. For example, inductors which are key elements of at least the bandpass filter and SCA trap are not available in integrated form and if the functions of these devices are required they must be synthesized in some manner. Hence, it is often most advantageous to eliminate the need for inductive functions wherever possible.

The situation in a color television receiver is somewhat similar to that outlined above. Specifically, the NTSC standards specify that a composite color television transmission include luminance information which extends in a first frequency band from very low frequencies (about 10 Hz. or less) to approximately 4.2 megacycles. The composite signal also includes a suppressed-carrier, amplitude-modulated subcarrier bearing information collectively defining the hue and saturation of an image to be reproduced. This color information occupies a second band extending from very low frequencies to approximately one and one-half megacycle per second as transmitted. As modulation components, the color information is in a third frequency band as vestigial sideband modulation of the 3.58 megacycle suppressed subcarrier signal. It is essential in a color receiver to separate the luminance and subcarrier modulation and to derive from the subcarrier modulation three distinct color control signals, usually the $(R-Y)$, $(B-Y)$ and $(G-Y)$ color difference signals, which are used to intensity modulate the electron beam of respective ones of the three electron guns of the color television tube. This objective usually requires that the subcarrier detector be preceded by a bandpass filter network for attenuating that portion of the luminance signal of a lesser frequency than the lower sideband of the subcarrier modulation. Also, following the subcarrier detector there is provided in each of the three amplifiers for the color difference signals, a trap for the subcarrier switching frequency as well as individual low pass filter networks which fully attenuate the high frequency portion of the luminance band, thereby leaving only the detected color information for application to the several amplifiers. All of these filter networks are relatively expensive and also complicate the construction of the television receiver in integrated circuit form.

SUMMARY OF THE INVENTION

It is therefore an object of the present invention to provide a new and improved synchronous detector for a color television receiver, a stereo-FM receiver or the like.

It is also an object of the present invention to provide an improved signal balanced synchronous detector which is itself suitable for integrated circuit construction and which permits simplification, if not the elimination, of filter networks conventionally employed in color television receivers and some forms of stereophonic FM receivers.

It is another object of the present invention to provide a basic functional block which lends itself to repetitive usage in a number of circuit environments, a factor of substantial importance in the economy of integrated circuit construction.

Accordingly, the invention is directed to a receiver of the type for responding to a composite signal including components within a given frequency band representing information and a suppressed-carrier amplitude-modulated subcarrier modulated by components in a second frequency band which at least partially overlaps the given frequency band and represents other information. Specifically, the invention is directed to a signal balanced synchronous detector comprising means for developing a reference signal having a frequency equal to that of the subcarrier, two transistors each including a pair of primary electrodes and a control electrode, and means for applying the composite main carrier modulation and the reference signal between the control electrode and one of the primary electrodes of each of the transistors. Common passive load circuit means, coupled to the other of the primary electrodes of the transistor, are provided for developing detected modulation components lying within the second frequency band.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

DESCRIPTION OF THE PREFERRED EMBODIMENTS

Figures 1, 2:
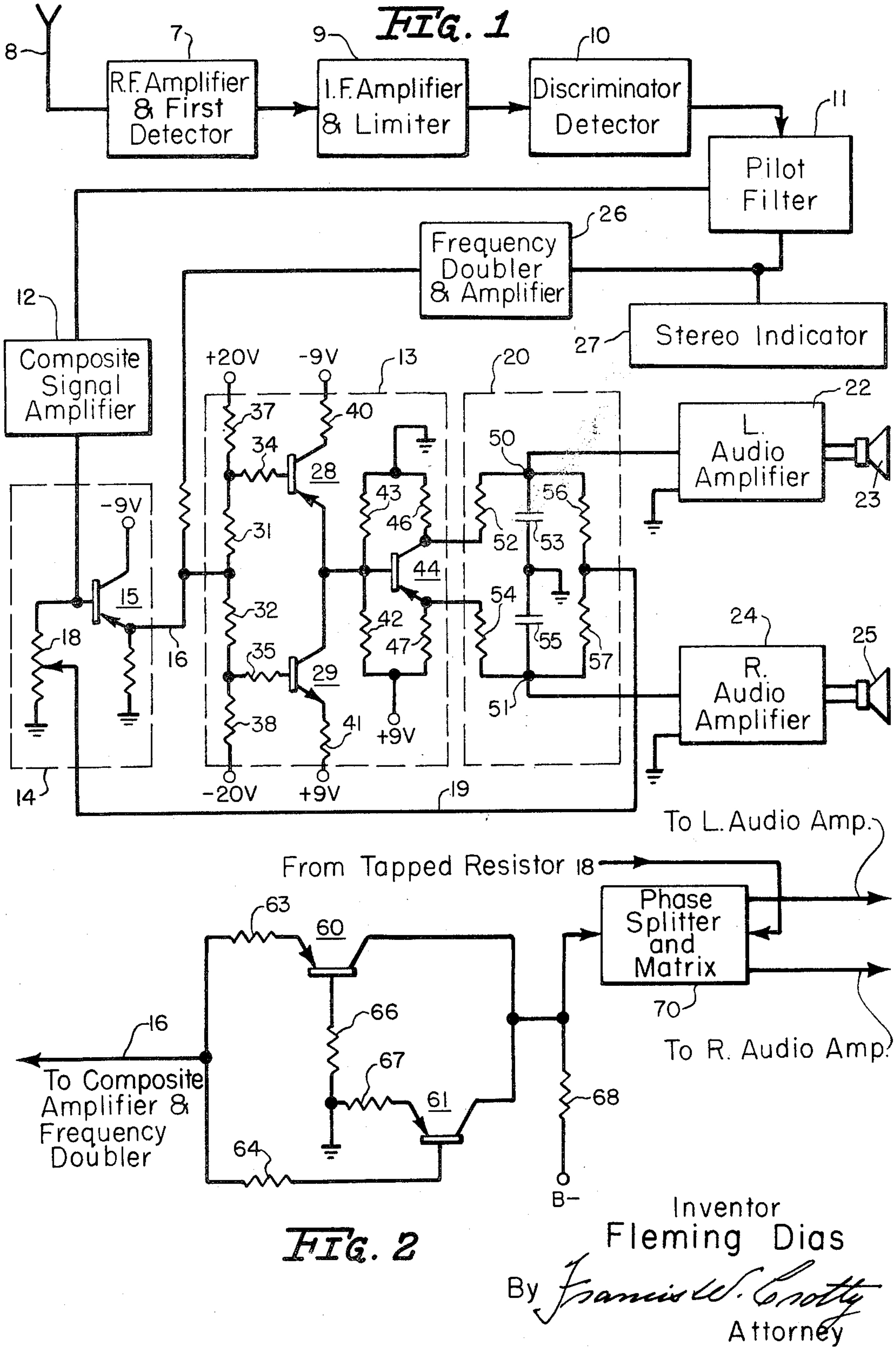
FIGURE 1 is a schematic illustration of a stereophonic FM receiver including a preferred embodiment of the present invention.
FIGURE 2 is a partial schematic diagram showing an alternative embodiment of the invention as used in a stereo receiver.

Referring now to FIGURE 1, the stereophonic receiver there shown comprises circuits which through the composite amplifier are conventional. These include a radio frequency amplifier of any desired number of stages and a heterodyning stage or first detector, both being represented by block 7. The input of the amplifying portion connects with a wave-signal antenna 8 and the output is coupled to a unit 9 which may include the usual stages of intermediate frequency amplification and one or more amplitude-limiters. Following IF amplifier and limiter 9 is a frequency modulation detector 10 responsive to the amplitude limited IF signal for deriving an output signal representing the modulation of the received carrier. Second detector 10 may be of any well-known configuration but since a high degree of amplitude limiting is desirable, it is preferable that this unit be a ratio detector. The composite stereo modulation signal is developed at the output of detector 10 and is applied to a composite signal amplifier 12 through a series connected pilot filter 11; filter 11 represents a relatively low impedance to all but the pilot signal. Ordinarily block 12 includes a trap for attenuating the subcarrier frequency used in SCA transmissions of the type previously mentioned. The present invention permits this trap to be simplified, if not eliminated.

A detector 13 is coupled to the output of amplifier 12 by an isolation stage 14 which comprises an emitter follower transistor 15 having its collector coupled to a −9 v. supply and its emitter connected to a reference or ground potential through a load resistor. The emitter of transistor 15 is also connected to an input lead 16 of detector 13. The base of transistor 15 is connected to the output of amplifier 12 as is a resistor 18 which has its remaining terminal returned to ground. An intermediate tap of resistor 18 is connected by a lead 19 to a matrix network 20 to be described.

Although the audio sum signal, the difference signal modulation, a subcarrier reference signal to be considered, and at least some components of the SCA subcarrier, etc. are applied to the input lead 16 of detector 13, only the detected difference signal information in a positive and negative phase is provided at its output terminals. As shown, these output terminals are connected to matrix 20. The L and R stereophonically related program signals developed within matrix 20 are applied to respective amplifiers and loudspeakers 22, 23 and 24, 25. Of course, loudspeakers 23 and 25 are arranged spatially to create a stereophonic sound pattern in the area they serve.

Since, as previously explained, demodulator 13 must be properly synchronized for detection of the subcarrier modulation, there is provided means for locally deriving a reference signal having a frequency equal to that of the absent subcarrier. This means includes the pilot filter 11 which segregates the pilot tone from the composite modulation and applies this tone to a frequency doubler and amplifier 26. The pilot tone may also be utilized to directly actuate an indicator circuit 27 to provide a visual indication of stereophonic reception. Doubler 26 operates on the pilot signal to develop a reference or switching signal which is in frequency and phase coherence with the absent subcarrier; this signal is joined with the output from composite amplifier 12 and applied to detector 13 by common input lead 16.

Turning now to a more specific consideration of detector 13, this circuit comprises two transistors 28 and 29 each including a pair of primary electrodes and a control electrode. Transistors 28 and 29 are complementary symmetry transistors of respectively the PNP and NPN types and each includes the normal complement of transistor electrodes, that is, a collector, base and emittter. Such complementary transistors are, of course, per se well-known to the art. In accordance with the present invention, means are provided for applying the composite main carrier modulation and the reference signal between the control electrode and one of the primary electrodes of each of the transistors. Specifically, lead 16 which carries this information is coupled to the common junction of a pair of resistors 31 and 32 which have their opposite terminals coupled by resistors 34 and 35 to the base electrodes of transistors 28 and 29, respectively. Resistors 31 and 32 also form part of a voltage divider network for biasing the base electrodes of transistors 28 and 29. For this purpose the opposite terminals of resistors 31 and 32 are also respectively coupled to a +20 volt and a −20 volt power supply through resistors 37 and 38. As will be apparent to those skilled in the art, the use of balanced power supplies in the illustrated fashion avoids the need for DC blocking or coupling capacitors. Capacitors of this type are not readily manufactured by integrated circuit techniques.

The collector electrode of transistor 28 and the emitter electrode of transistor 29 are returned by individual resistors 40 and 41 to 9 volt power supplies of appropriate polarity as indicated. The other primary electrodes of these transistors, that is, the emitter of transistor 28 and the collector of transistor 29 are coupled to a common passive load circuit means for developing substantially only the detected subcarrier modulation, i.e., the $(L-R)$ difference signal. This common load circuit comprises a pair of series connected resistors 42, 43 extending from a +9 v. supply to ground and having their common junction coupled to the common primary electrodes of these transistors. Resistors 42, 43 also provide a desired quiescent bias for transistors 28 and 29 as well as a following stage to be considered. For reasons that will be explained more fully later herein, the several voltage divider biasing arrangements above-described provide a normal net reverse bias for the base-emitter junctions of transistors 28 and 29.

The common junction of resistors 42 and 43 is also coupled to a phase-splitting stage included within detector 13 and comprising a transistor 44 of the PNP gender. The collector of transistor 44 is coupled to ground by a load resistor 46 while its emitter electrode is coupled through a similar load resistor 47 to a +9 v. supply. The collector and emitter electrodes of transistor 44 are also connected by individual output leads of the detector to matrix 20 and, more specifically, to respective ones of independent matrix junctions 50, 51 by conventional L-section de-emphasis networks 52, 53 and 54, 55, respectively. As will be recalled, the intermediate tap of resistor 18 is likewise coupled to matrix 20, specifically matrixing junctions 50 and 51 through individual de-emphasis networks 56, 53 and 57, 55.

The receiver of the present invention is capable of compatible reception and reproduction of monaural FM transmissions, however, in considering its operation it will initially be assumed that a stereophonic broadcast of the composition previously described is being received. Under such conditions, the frequency modulated main carrier intercepted by antenna 8 is translated in conventional fashion to detector 10 whereat the modulation components corresponding to the stereo broadcast are derived. The audio sum signal and the modulated subcarrier are translated through pilot filter 11, which is a low impedance to these signals, and are developed at a high level across resistor 18 at the output of amplifier 12.

Meanwhile, the pilot signal, extracted from the composite modulation by filter 11, is coupled both to a stereo indicator 27 which may include a lamp or the like to provide a visual indication of such reception, and to frequency doubler 26. As with all circuits shown in block form in FIGURE 1, doubler 26 may be of entirely conventional construction and, for example, may comprise a full-wave rectifier for the pilot tone followed by an amplifier tuned to the second harmonic of this frequency. Of course, the second harmonic of the pilot tone is identical in frequency and is preadjusted for phase coincidence with the absent subcarrier. Alternatively, the reference signal may, of course, be utilized directly from the output of the full-wave rectifier, without a following tuned amplifier, if its amplitude is sufficient at this point. The operation of the detector under both conditions will be described more fully later herein. At any rate, the reference signal ($K \cos \omega_{sc}t$, where K is a constant and $\omega_{sc}$ is the angular frequency of the subcarrier) is united with the composite information at detector lead 16 and is applied as a common input to the base electrodes of transistors 28 and 29. The reference signal is of a sufficient amplitude to periodically override the normal reverse bias between the emitter-base junctions of these transistors and to render them operative in alternation at the subcarrier reference frequency rate.

Thus, during one-half cycle of the reference subcarrier, only transistor 28 is operative and during the next or alternate half-cycle only transistor 29 is operative. Accordingly, by now well understood demodulation theory, there is developed at the emitter of transistor 28 signal components corresponding to the product of the composite modulation information and a one-zero, i.e., on-off, switching function. Similarly, there is developed at the emitter of transistor 29 demodulation components corresponding to the product of a zero-one switching function and the composite signal information. These latter components are translated to the collector electrode of transistor 29 in an opposite phase by conventional transistor action. It can be demonstrated that the lower frequency components developed at the emitter of transistor 28 and at the collector of transistor 29 under these circumstances are as follows:

Signal components as the emitter of transistor 28=

$$\frac{1}{2}(L+R)+\frac{1}{\pi}(L-R)+K \cos \omega_{sc}t+\ldots$$

Signal components at the collector of transistor 29= −

$$\frac{1}{2}(L+R)+\frac{1}{\pi}(L-R)-K \cos \omega_{sc}t+\ldots$$

Since the above electrodes have a common load circuit, it is apparent that the sum signal and switching signal components precisely cancel one another therein leaving only the audio difference signal components to combine in an aiding sense. Some components of the SCA subcarrier are also effectively cancelled at this point, likewise as a result of the complementary symmetry of the detector transistors and their interconnection in the manner of the invention. The difference signal is developed in opposite polarities at the collector and emitter electrodes of phase-splitting amplifier 44 in conventional fashion.

A measured portion of the audio sum signal is coupled from the adjustable tap of resistor 18 to each of matrix junctions 50 and 51; the suppressed-subcarrier sidebands likewise developed across resistor 18 are bypassed by the de-emphasis networks while the subcarrier reference signal is isolated from resistor 18 by emitter-follower transistor 15. Since the subcarrier reference frequency is not conveyed to the matrix from either stereo detector 13 or the tap of resistor 18, subcarrier notch filters are not required in the matrix in controdistinction to most prior art circuits. The audio sum signal is added to each of the phase opposite audio difference signals conveyed to the matrix points from amplifier 44. The separated L and R audio signals developed at junctions 50 and 51, respectively, are amplified and reproduced by their corresponding amplifiers and loudspeakers in conventional fashion.

Assuming now that a monophonic broadcast is being received, it will be recognized that the output of detector 10 consists of audio frequency components corresponding to the modulation of that transmission. These audio components are passed by filter 11, amplified by composite amplifier 12 and developed at a relatively high level across load resistor 18. Since, as previously stated, transistors 28 and 29 of the stereo detector are normally reverse biased, both of these transistors represent effectively an open circuit for the monaural signal. The monaural information is thus coupled to matrix junctions 50 and 51 exclusively by lead 19 which extends thereto from the intermediate tap of resistor 18. The monaural information is likewise amplified and reproduced in conventional fashion.

In summary, the stereo detector of the present invention not only performs the desired demodulation function but in the course thereof also effectively separates the difference signal modulation from the main channel information without a bandpass filter, as required in prior art circuits. Also, the present invention permits at least a relaxing of requirements on the usual SCA filter and elimination of the distributed notch filters. These features, which result in significant circuit economies and simplifications highly attractive for integrated circuit applications, are attained without adding corresponding complexity to the detector. In fact, the detector of the invention consists of only transistors and resistors both of which types of components are readily made in integrated form. Additionally, the detector transistors and their associated load and biasing resistors comprise a basic functional block which has application in other environments some examples of which will presently be described. Since fixed set-up costs for production of a given integrated circuit are ordinarily quite high, such multiple application can provide significant reductions in cost per unit. In this regard, the functional block also has application as a full-wave rectifier useful in the frequency doubling circuit of a stereo receiver. A signal applied to the input of the block which is of sufficient amplitude to alternately switch the transistors on and off is recovered as a full-wave rectified signal in the common load circuit. The detector just described could also function as a conventional push-pull amplifier if the integrated chip is provided with proper output terminals which could be interconnected or shunted according to the desired mode of operation of the circuit block. Furthermore, the complementary matched symmetry of the detector transistors required for ideal operation of the detector of the invention is almost inherently assured by normal integrated circuit manufacturing procedures which dictate fabrication of all the components together under an identical processing environment.

By way of illustration which will be recognized by those skilled in the art as in no way a limitation or restriction of the present invention, the following component values were employed in an operative embodiment of the circuit of FIGURE 1:

| | | |
|---|---|---|
| Transistors: | | |
| 28, 44[1] | | Type No. 2N1303 |
| 29[1] | | Type No. 2N1302 |
| Resistor: | | |
| 31 | ohms | 10K |
| 32 | do | 10K |
| 34 | do | 470 |
| 35 | do | 470 |
| 37 | do | 10K |
| 38 | do | 10K |
| 42 | megohms | 1.5 |
| 43 | ohms | 3.9K |
| 46 | do | 3.9K |
| 47 | do | 3.9K |
| 52 | do | 10K |
| 54 | do | 10K |
| 56 | do | 10K |
| 57 | do | 10K |
| Capacitor: | | |
| 53 | micromicrofarads | 5600 |
| 55 | do | 5600 |

[1] Manufactured by Texas Instruments Co.

The stereo separation of this circuit, that is, the ratio of desired signal voltage in one channel to the undesired cross-talk contributions of the other channel was measured at 25 db at 1 kHz. and at 8 db at 14 kHz. The distortion level in each channel was better than 35 db. As previously stated, the detector circuit can be synchronized directly from the 38 kHz. component developed from the full-wave rectified 19 kHz. pilot tone. It has been found that the quality of the demodulated audio provided in such circumstances is reasonably independent of amplitude variations of the subcarrier switching signal. The foregoing detector when synchronized in this fashion was found to provide a separation of 20 db at 1 kHz. and 3 db at 14 kHz. The second harmonic distortion was better than 35 db. By operating the detector directly from the rectified pilot tone, the pilot chain is simplified by one transistor and a 38 kHz. tuned circuit. In this case, however, the circuit is not totally balanced against the switching frequency.

An alternative embodiment of the invention is shown in the partial schematic diagram of FIGURE 2. This circuit is somewhat similar in structure and operation to the detector of FIGURE 1 although here a pair of transistors of like gender or symmetry are employed rather than complementary symmetry transistors. Specifically, this embodiment comprises a PNP transistor 60 and a similar transistor 61, the former being connected for operation in a common base mode and the latter for operation in a common emitter mode. The emitter of transistor 60 and the base of transistor 61 are coupled by input resistors 63 and 64, respectively, to the lead 16 which serves as a common input for the composite signal amplifier and frequency doubler. The base of transistor 60 is coupled to ground by a resistor 66 while the emitter of transistor 61 is coupled to ground through an emitter resistor 67. The collector electrodes of transistors 60 and 61 are connected to a B− supply through a common passive load circuit consisting of a resistor 68. The collector electrodes are also coupled in common as an input to a phase-splitter and matrix network 70 which is conveniently shown in block form. This network may, of course, be identical to the corresponding circuits illustrated in FIGURE 1. Likewise there is here also supplied to the matrix of block 70 a sum signal voltage from the intermediate tap of resistor 18. The left audio signal is thus developed at one of the output terminals of matrix 70 and the right audio signal at the other output terminal, as indicated in the drawing. For simplicity, the following amplifiers and loudspeakers are not illustrated.

The operation of the circuit of FIGURE 2 is also similar to that previously explained in connection with the circuit of FIGURE 1. Briefly, and assuming the conditions for stereophonic reception, the composite stereo information and the accompanying reference signal are applied as an input to transistors 60 and 61 from lead 16, the circuitry preceding this point being identical in construction and operation to that of FIGURE 1. Since transistors 60 and 61 are of like gender a switching signal at the emitter of transistor 60 of a polarity to forward bias its emitter-base junction is of a polarity to reverse bias the emitter-base junction of transistor 61 when applied to the base of this transistor. Thus, transistors 60 and 61 are conductive in alternation at the reference signal rate. Furthermore, the common base configuration of transistor 60 results in a signal at its collector electrode which is of a like polarity to that developed at its emitter electrode while the information developed at the emitter electrode of transistor 61 is transferred to its collector electrode in an opposite phase. It will thus be recognized that the individual audio sum signals cancel in the common collector load circuit of these transistors while the difference signals combine in a sense to reinforce one another. The detected difference signal components are coupled to the phase-splitter and matrix 70 and left and right audio signals are developed at the output therefrom in the same fashion as previously described in connection with FIGURE 1. In the presence of a monaural signal, both transistors 60 and 61 are physically disconnected from composite amplifier 12 by a switch (not shown) and the audio information is coupled equally to each loudspeaker from the tap of resistor 18.

This embodiment of the invention, like that of FIGURE 1, is fully signal balanced and the only information derived at the output of the detector is the demodulated difference signal information. Furthermore, in both cases this result is obtained without the use of any filter networks. However, the present embodiment is not preferred because of the substantial difference in input impedance between transistors 60 and 61 when connected in the manner disclosed.

Figure 3:
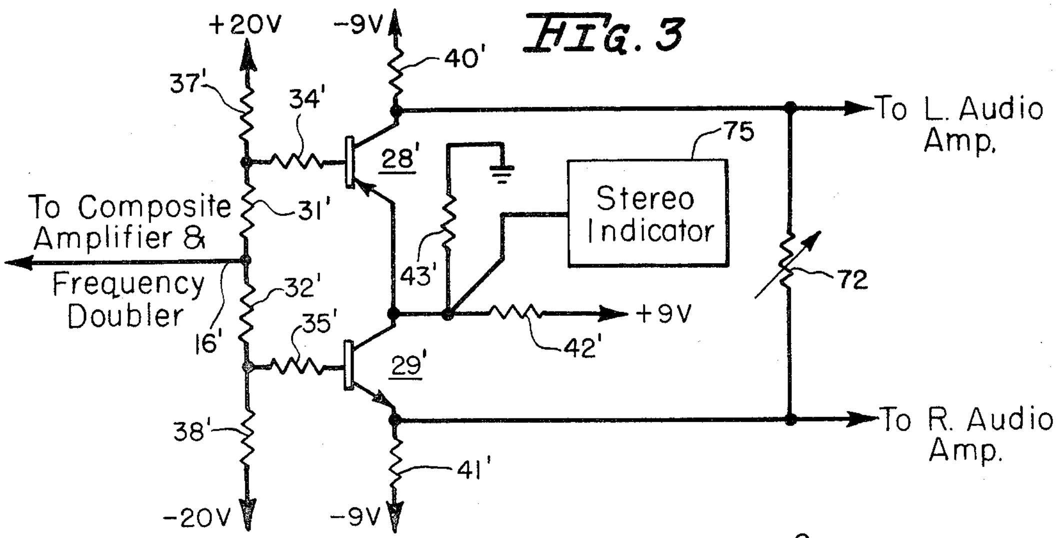
FIGURE 3 is a partial schematic diagram of a further alternative embodiment of the invention having particular utility in a stereo receiver.

A further alternative embodiment of the invention is shown in the partial schematic diagram of FIGURE 3. This circuit is likewise similar to that in FIGURE 1 and the basic functional block is here used. The only difference between the circuits is in the manner in which the detected signal information is utilized. For clarity in depicting the correspondence between these circuits, like components bear the same reference numerals except that primes have been added. The collector electrode of transistor 28′ and the emitter electrode of transistor 29′ are directly coupled respectively to the L and R audio amplifiers (not shown). These electrodes are also interconnected by a cross-coupling resistor 72. The common junction of transistors 28′ and 29′ is connected to a stereo indicator denoted by a block 75 in the figure.

In considering the operation of this circuit, it will again be assumed that a stereophonic broadcast is being received and that the modulation components corresponding to that broadcast are applied to transistors 28′ and 29′ through common input lead 16′. Thus, during one-half cycle of the reference subcarrier transistor 28′ is operative and during the next or alternate half-cycle only transistor 29′ is operative. Accordingly, it will be recognized from the equations given previously herein that only the difference signal components appear across the common load circuit for the transistors. It will also be recognized from the previously given equations, that the audio components present at the collector electrode of transistor 28′ and the emitter electrode of transistor 29′ are as follows:

Audio component at the collector of transistor 28′=

$$-\frac{1}{2}(L+R)-\frac{1}{\pi}(L-R)=-.8L-.2R$$

Audio component at the emitter of transistor 29′=

$$\frac{1}{2}(L+R)+\frac{1}{\pi}(L-R)=.8R+.2L$$

Thus primarily the L audio component is derived at the collector of transistor 28′ while predominantly the R audio component is developed at the emitter of transistor 29′. The relatively small unwanted signal contribution or cross-talk in each channel is cancelled by the presence of resistor 72 which cross-couples a preselected amplitude of the signal from each channel to the opposite channel. A simple cross-coupling resistor is adequate since the L and R signals are here developed in opposite phases and thus direct matrixing results in the desired cancellation. In prior art detectors of the average type, a special matrixing signal of opposite polarity was required as the L and R channels developed their respective signals in like phase. The present circuit thus represents a material simplification over the prior art. Proper phase reproduction is obtained simply by proper connection to the loudspeakers since the phase of a reproduced signal is a function of the polarity of the connection to the loudspeaker terminals. However, it should be recognized that the outputs of the present detector are not signal balanced and, accordingly, the usual SCA filter must be present in the composite amplifier and the de-emphasis networks preceding each amplifier must include distributed notch filters or the like for bypassing the subcarrier reference signal.

Transistors 28′ and 29′, it will be recalled, normally carry a reverse bias between their emitter and base electrodes so as to be inoperative in the absence of a switching signal exceeding a predetermined threshold. Thus, in the absence of additional means the present circuit only receives stereo stations, a feature which is preferred by many consumers. Monaural reception may be obtained by use of a manual switch which selectively couples the output of discriminator 10 to either the stereo detector or directly to the audio amplifiers. This switch arrangement and a variant thereof are disclosed in detail and claimed in Patent 3,248,484—Beckman which is assigned to the same assignee as the present invention. As a further alternative, the power supply voltages may be adjusted so that the transistors normally carry a forward bias. Thus, during monaural reception transistors 28′ and 29′ passively translate the audio information to the loudspeakers. The switching signal during stereo is, of course, adequate to override a small forward bias on the transistors and render them nonconductive on alternate half-cycles. Hence, during stereo reception the circuit would still function in the manner already described.

A stereo indicator 75 is connected to the common load circuit for transistors 28′ and 29′. Since during monaural reception there is a zero net signal at this point while a detected difference signal is developed during stereo reception, any mechanism responsive to this change will provide a stereo indication. For example, indicator 75 may be a lamp circuit responsive to the change in average signal level or a loudspeaker for providing a direct aural indication. Of course, in the latter instance a manual switch must be provided for selectively connecting and disconnecting the loudspeaker from the circuit.

In addition to providing a novel form of stereo indication, the circuit just described is also attractive from the viewpoint of alignment. Specifically, in initially setting up the receiver at the factory or after a serviceman has made certain repears, the local reference signal generator must be adjusted to provide a signal in phase identity with the absence subcarrier. Conventionally this requires a rather expensive test generator which provides a suppressed carrier modulation component and a pilot tone. The generator is connected at the output terminals of the FM detector and slugs in the tuned coils of the local reference signal generator or the like are adjusted to provide from the pilot tone a signal which is in proper phase for demodulation of the difference signal. In the embodiment of the invention just described, this complicated procedure and apparatus is unnecessary. In accordance with the invention, the $(L+R)$ portion of the stereophonic program and the 38 kHz. reference signal are effectively cancelled in the common load circuit of the detector transistors and, accordingly, it is only necessary to tune the receiver to an ordinary incoming stereophonic program and adjust the local reference signal generator such that the average signal level present in the common load circuit is a maximum. The maximum indication denotes a phase identity between the locally created reference signal and the absent subcarrier.

The present invention also finds important application as a detector for a color television receiver. As will be recalled, present NTSC standards specify that a composite color television transmission include a suppressed-subcarrier component amplitude modulated with information defining the hue and saturation of an image to be reproduced. Conventional television receivers for this purpose include an image screen composed of a mosaic of phosphor triads and three electron guns for independently scanning respective elemental areas of each triad. The electron beam intensity of each gun must be separately controlled and therefore it is ultimately necessary to derive three primary color control signals, usually selected as the $(R-Y)$, $(B-Y)$ and $(G-Y)$ color difference signals, to effect this end. The primary color control signals may be developed from the received information in any one of several ways. However, to take advantage of the full bandwidth occupied by the color subcarrier transmission, it is necessary to first demodulate the subcarrier information along a pair of secondary phase axes, known as the I and Q axes and then to develop the three primary color signals by proper vector addition of these secondary signals. As will be seen, the preferred embodiment of the invention operates in this manner.

Figure 4:
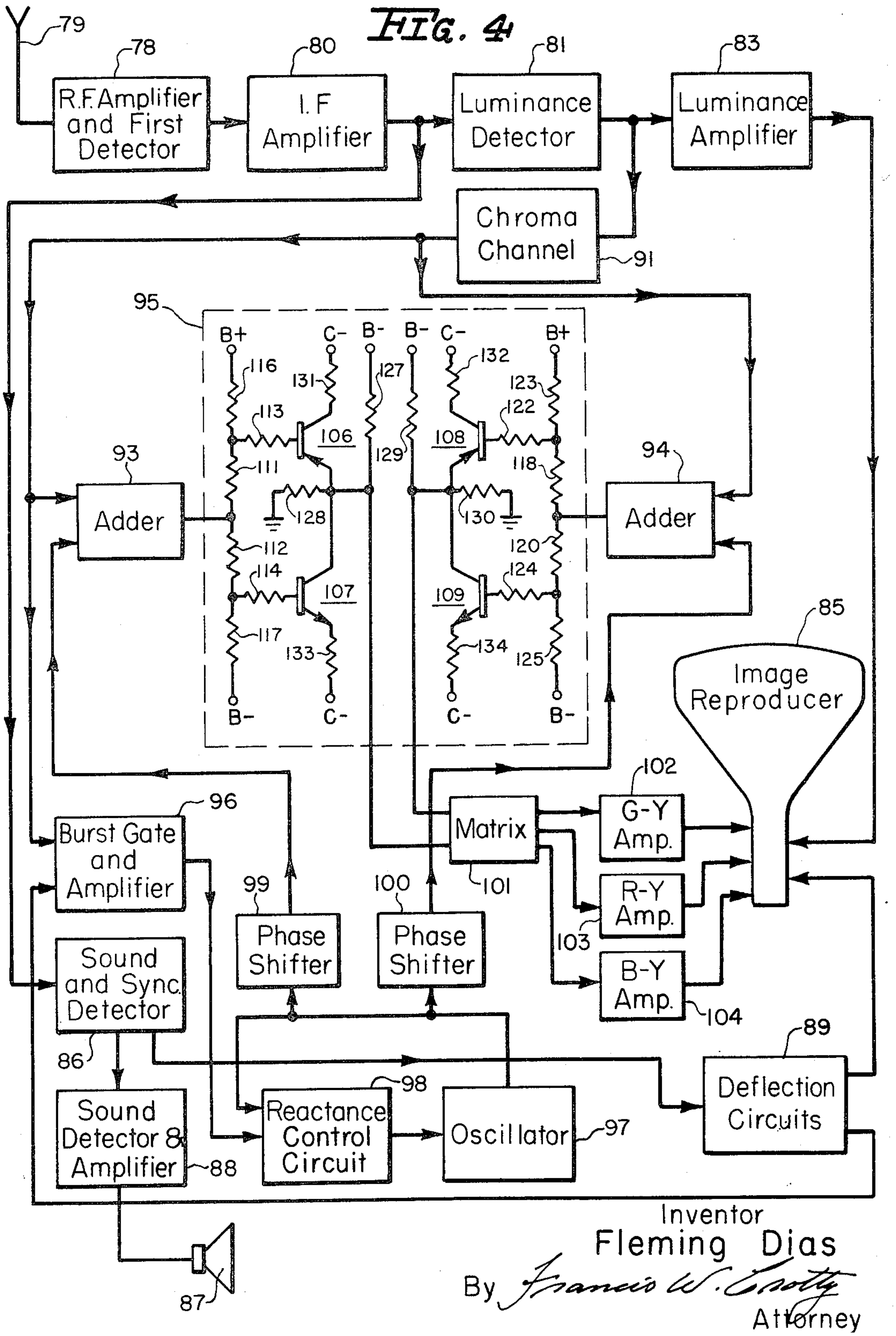
FIGURE 4 is a schematic diagram of a color television receiver embodying the present invention.

Referring specifically now to FIGURE 4, the color television receiver there illustrated comprises a radio frequency amplifier and first detector stage 78 which derives an input in conventional fashion from a wave-signal antenna 79. The intermediate frequency output signal from the heterodyning stage of block 78 is coupled to an IF amplifier 80 which, in turn, is coupled both to a luminance detector 81 and to sound and pictorial synchronizing circuits to be described. The video frequency output of luminance detector 81 is coupled along two paths, the first being to a luminance amplifier 83 which may include any number of amplifying stages and an appropriate time delay network. The amplified video signal provided by luminance amplifier 83 is definitive of relative pictorial brightness or intensity; this signal is applied to an image reproducer 85, which in this case may be a standard three-gun, shadow-mask color cathode ray tube. The construction of this tube as well as other apparatus shown in block form in the figure is not critical to the present invention and may take any of a variety of forms well-known to the art.

The image scanning and sound portion of the composite color transmission are also developed from circuits coupled to the output of IF amplifier 80. These circuits include a sound and sync detector 86. The sound bearing portion of the output signal from detector 86 is coupled to a loudspeaker 87 by a sound detector and amplifier 88. The remaining signal components are supplied to deflection circuits 89 which are coupled to the deflection system of image reproducer 85.

The signal at the output of luminance detector 81, in addition to including video frequency components, also includes a suppressed-carrier component which, as previously stated, is amplitude modulated with a plurality of color control signals which collectively define the hue and saturation of the received image. The modulated subcarrier above-described is developed in a chroma channel 91 which conventionally includes filter networks for fully attenuating that portion of the luminance information which is of a lesser frequency than the lower sideband of the modulated subcarrier. As will presently be seen, the detector of the present invention permits at least simplification of these filter networks. Block 91 includes amplifying stages for developing the chrominance modulated subcarrier (and also the luminance information in the absence of substantial filtering means) at a relatively high level from which it is applied to a pair of adder or matrix circuits 93 and 94.

Adding networks 93 and 94 each provide a singular input to a novel chrominance detector 95 shown in dashed outline in the drawing from respective pairs of inputs. One input to each adder is provided from chroma channel 91 while the remaining inputs to each channel constitute respective local reference signals. Specifically, detector 95 is synchronized by a pair of locally derived reference signals which are developed from a component of the color transmission likewise available at the output of detector 81; this component constitutes short, periodic signal bursts having a like frequency and a predetermined phase correspondence to the absent subcarrier. The means for developing the local reference signal includes a burst gate and amplifier 96 coupled to receive an input from luminance detector 81. Amplifier 96 is periodically gated on by pulses from deflection circuits 89 so as to be operative only during intervals in which reference burst signals are received. The amplified burst signals from block 96 are coupled to a local oscillator 97 by a reactance control circuit 98. Control circuit 98 compares the reference burst with the output of oscillator 97 to generate an error signal which locks the oscillator in a predetermined phase and frequency relation to the reference burst. This standard is shifted in phase by parallel networks 99 and 100 to develop a pair of reference signals of like frequency but differing phase for application to respective ones of adding networks 93 and 94. Detector 95 operates on the combined signals available at the output of adders 93 and 94 to provide a pair of demodulated color control signals, namely the I and Q signals, which are individually connected as inputs to a matrix 101. The three primary color control signals developed at individual outputs of matrix 101 are amplified by amplifiers 102, 103 and 104 and are separately applied to image reproducer 85, wherein they are combined with the luminance signal from luminance amplifier 83 to reproduce images having proper luminance chrominance characteristics.

Turning now to a more specific consideration of detector 95, this circuit comprises a first and second pair of complementary transistors 106, 107 and 108, 109 with all of these transistors including the usual emitter, base and collector electrodes. It will be recognized that each pair of transistors is part of a basic functional block identical to that described in connection with FIGURES 1 and 3. As previously mentioned, a basic network suitable for several environments is attractive for integrated circuit applications as greater economies in manufacturing are obtained.

Means are provided for applying at least those frequency components lying in a third frequency band defined by the sidebands of the modulated subcarrier to the base electrodes of the first and second pair of complementary transistors. This means comprises the output leads of adding networks 93 and 94 which are each coupled to the base electrodes of both transistors of a corresponding pair of complementary transistors from the center junction of like voltage divider networks. Specifically, the output of adder 93 is coupled to the common junction of a pair of resistors 111 and 112 which have their opposite terminals coupled by resistors 113 and 114 to the base electrodes of transistors 106 and 107, respectively. Resistors 111 and 112 also have their uncommon terminals coupled respectively to B+ and B− biasing supplies through voltage divider resistors 116 and 117. Similarly, the output of adding network 94 is coupled to the base electrodes of transistors 108 and 109 from the common junction of resistors 118 and 120. The opposite terminal of resistor 118 is coupled to the base electrode of transistor 108 by a resistor 122 and a B+ operating supply through a resistor 123. Resistor 120 has its opposite terminal coupled to the base electrode of transistor 109 by a resistor 124 and to a B− operating supply through a resistor 125.

Complementary transistors 106 and 107 have respectively an emitter and collector electrode coupled to the common junction of series resistors 127 and 128; the opposite terminals of these resistors are connected respectively to B− and ground. Complementary transistors 108 and 109 are likewise connected to a common passive load circuit comprising series resistors 129 and 130 also extending from B− to ground. The center junctions of resistors 127, 128 and 129, 130 are also connected as separate inputs to matrix 101. The collector electrodes of transistors 106 and 108 are individually coupled to a C− supply by resistors 131 and 132, respectively. The emitter electrodes of transistors 107 and 109 are likewise coupled to a C− supply by individual load resistors 133, 134.

With the exception of detector 95, the color television receiver circuit of FIGURE 4 is quite conventional and, accordingly, only a brief description of its operation need be given here. A received composite color signal is intercepted by antenna 79 and is amplified and translated to an intermediate frequency by the amplifier and detector of block 78. Intermediate frequency amplifier 80 further amplifies this signal, after which it is applied to both the luminance detector 81 and to a combined picture synchronizing and sound detector 86. The detected video components from detector 81, which represent the luminance component of a color telecast, are coupled with appropriate time delay and amplification through luminance amplifier 83 to image reproducer 85.

The detected output signal from sync and sound detector 86 is translated and amplified by conventional audio circuits 88 to drive loudspeaker 87. Detector 86 is also coupled to deflection circuits 89 which are responsive to the detected scanning information to develop the usual horizontal and vertical sweep signals required by image reproducer 85.

Chrominance channel 91 couples at least the chrominance subcarrier information at the output of luminance detector 81 to the individual adding networks 93 and 94. In the illustrated embodiment, the frequency response characteristics of the chrominance channel are such that the entire composite color signal is translated to the adding networks.

In the presence of the received signal, burst gate and amplifier 96 is selectively responsive to the burst signal portion of the transmission and is gated on by pulses from deflection circuits 89 so as to be operative only during intervals in which the burst signals are received. The amplified burst signal is compared in frequency and phase with the signal from local oscillator 97 in reactance control circuit 98 and a control signal is generated corresponding to any phase error therebetween. This control signal is applied to the oscillator to effectively lock it in frequency and phase to the reference burst. The standard signal thus developed at the output of oscillator 97 is supplied through individual phase shifting networks 99 and 100 to adding networks 93 and 94, respectively. Each of the subcarrier frequency reference signals thus derived is of an amplitude sufficient to periodically override the normal reverse bias on its associated pair of complementary transistors and thereby render the devices of each pair conductive and nonconductive in alternation at the color subcarrier frequency rate. The normal reverse bias is effective to preclude operation of the detector under quiescent conditions or actuation in response to randomly communicated noise signals; this arrangement thus at least supplements the usual color killer circuit.

Figures 5, 6:
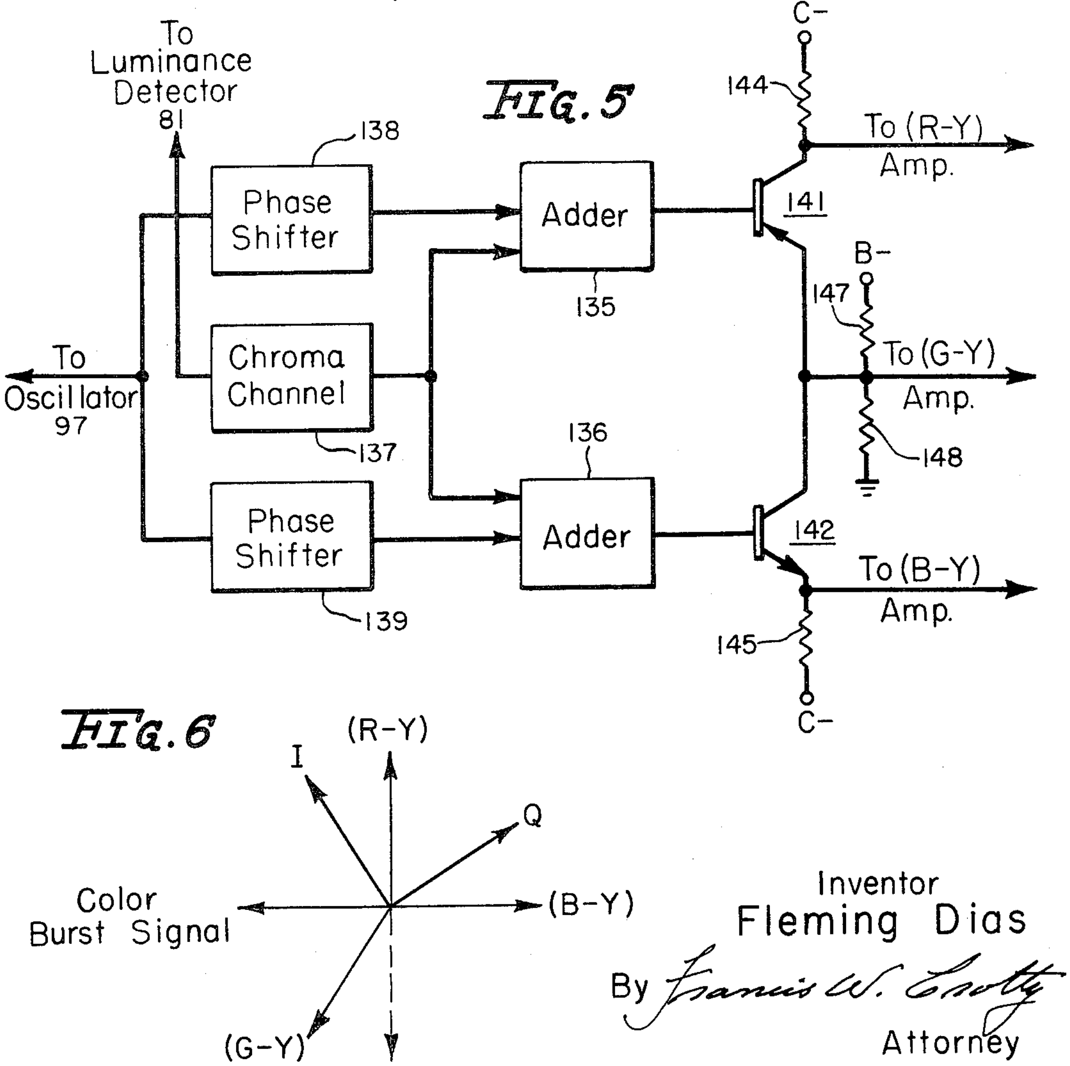
FIGURE 5 is an alternative embodiment of the invention useful in a color television receiver.
FIGURE 6 is a vector diagram showing the phasor relationships between various color control signals and the color synchronizing burst signal.

At this point, it is advantageous in understanding the operation of the circuit of the invention to refer momentarily to the vector diagram of FIGURE 6. This figure is a phasor diagram illustrating the relative angular orientation of the three primary color control signal vectors and the angular relation of the secondary I and Q control signals thereto. As shown, the $(B-Y)$ signal is in quadrature with the $(R-Y)$ signal and is in phase opposition to the color burst. The $(G-Y)$ control signal leads the $(R-Y)$ signal by 146.8°. The Q signal is 33° advanced in phase from the $(B-Y)$ signal and the I axis is 90° in advance of the Q signal. As is well understood in the art, a shifting of a subcarrier frequency reference signal into phase coincidence with a given color axis permits the corresponding signal information to be demodulated by synchronous detection methods. Furthermore, and as is likewise understood in the art, the color control signal vectors are interrelated and, accordingly, demodulation along any two color axes provides all of the information necessary to develop the three primary color difference signals by proper vector addition of the two demodulated signals. Of course, the three primary color difference signals may be directly demodulated by providing three local reference signals each corresponding in phase to a respective one of the difference signals; such an arrangement is also within the scope of the invention and will be discussed later herein. A more complete understanding of the principles of color television generally may be had by reference to Reissue Patent 24,747—Adler et al. which is assigned to the same assignee as the present invention.

Returning now to FIGURE 4, the I and Q signals are each synchronously detected by developing from the color burst signal individual local reference signals in phase coherence with respective ones of these control signals; the three primary color control signals are developed within matrix 101 by proper vector addition of these two secondary control signals. Since regeneration of the absent subcarrier is accomplished by a phase locked system synchronized from the color burst signal, the standard signal at the output of the oscillator 97 lags the burst input by 90°. Accordingly, for demodulation of the I and Q color vectors phase shifters 99 and 100 are constructed to introduce respectively at +33° and a −57° phase shift in the local oscillator signal.

The coincident application of the chrominance information and an appropriately phased reference signal to each of adders 93 and 94 ultimately results in the I and Q color signals being developed respectively across passive load circuits 127, 128 and 129, 130, the operational theory for each pair of complementary transistors here being identical to that previously discussed in connection with the stereo subcarrier detector of FIGURE 1. Also by the same analysis of relevant signal information previously given, it will be recognized that the I and Q load circuits are balanced against all other signal information applied to the base electrodes of the corresponding pair of complementary transistors, i.e. at least some components of the luminance information, etc. are effectively cancelled in these load circuits. Thus, the usual filtering networks within chroma channel 91 may be at least simplified and possibly eliminated. Also, since the respective load circuits are also balanced against the 3.58 mHz. reference signal neither matrix 101 nor any of the following amplifiers require the usual trap filters for this switching signal. These filters are rather expensive in discrete component form and equivalents are not readily had by present integrated circuit techniques. However, transistors and resistors are readily obtainable in integrated form and, accordingly, the illustrated detector is entirely compatible with this type of construction.

The I and Q color signals are combined in matrix 101 so as to derive the three primary color control signals. This matrix network may take any of several forms well-known to the art and for simplicity the circuit is not illustrated in detail herein. The three primary color difference signals are directly coupled from their corresponding amplifiers to image reproducer 85 wherein they are utilized in a conventional fashion to develop a color image. Conventionally, each of the amplifiers is provided with a low pass filter for bypassing the high end of the luminance channel information present at the output of prior art detectors. Since most luminance information is absent from the output of detector 95, a simplified low pass filter may be provided to bypass the relatively high frequency components at the output of detector 95.

Several variations of the above-described detector are also attractive. For example, the reference signals provided to adders 93 and 94 may be phased for demodulation along respectively the $(R—Y)$ and $(B—Y)$ axes. In this case, these primary color signals are recovered in the common passage load circuits and, of course, are balanced against the luminance information and reference signal. The negative or opposite phases of these difference signals are recovered across load resistors 131 and 132 of transistors 106 and 108, respectively. These negative phase signals added with proper weighting produce the $(G-Y)$ control signal; hence, this latter signal may be recovered at an intermediate tap of a resistor connected to cross-couple the collector electrodes of transistors 106 and 108. In this arrangement matrix 101 is omitted. However, the $(G-Y)$ load circuit is not signal balanced and the chroma channel must therefore include a luminance filter. Also, the $(G-Y)$ amplifier requires both a subcarrier trap and a conventional low pass filter; the remaining amplifiers do not require these networks. The added filter networks may be avoided and matrix 101 still excluded by recovering the $(G-Y)$ control signal in another manner. Specifically, in lieu of a cross-coupling resistor, an additional functional block is provided within detector 95. The chroma signal and a reference signal in phase coincidence with the $(G-Y)$ axis are applied to the input of this block and the $(G-Y)$ signal is recovered in the common load circuit of this functional block. Thus, the three primary control signals are each directly detected by individual detecting circuits and are directly coupled to their corresponding amplifiers.

A somewhat simplified embodiment of the invention is shown in FIGURE 5. Herein, the three primary color difference signals are directly developed by use of only a single pair of complementary transistors. However, in this arrangement the chroma channel must be provided with appropriate filter networks for attenuating the lower frequency components of the luminance information and furthermore two of the three color amplifiers must be provided with the conventional trap circuits for the 3.58 mHz. color reference signal and low pass filter networks; the input of one color amplifier is balanced against the switching frequency and need not be provided with a trap circuit nor a low pass filter.

Specifically, in this circuit arrangement two of the primary color control signals are directly detected and the third is developed by matrixing of the two detected signals in a proper magnitude and phase. The chroma information at the output of luminance detector 81 is conveyed to individual adding networks 135 and 136 through a chrominance channel 137 which is provided with a band pass filter network for fully attenuating the lower frequency portion of the luminance information. The standard signal from oscillator 97 is conveyed to adders 135 and 136 by phase shifting networks 138 and 139 which respectively provide a first reference signal in phase opposition to the $(R-Y)$ axis and a second reference in phase coincidence with the $(B-Y)$ axis.

The composite signals at the output of adders 135 and 136 are applied to the base electrodes of respective ones of a pair of complementary transistors 141 and 142. The normal input and biasing network for these transistors has been omitted for clarity. The collector electrode of transistor 141 and the emitter electrode of transistor 142 are coupled to a C— supply by individual load resistors 144 and 145. These electrodes are also individually coupled to an $(R-Y)$ amplifier and a $(B-Y)$ amplifier, not shown. The emitter of transistor 141 and the collector of transistor 142 are connected to the center junction of a common passive load circuit consisting of series resistors 147, 148 extending from B— to ground. The signal developed in this load circuit is connected to a $(G-Y)$ amplifier, likewise not shown.

This embodiment of the invention operates in a manner which is similar to the several embodiments previously discussed. Specifically, each of the transistors is periodically gated on and off at the subcarrier switching frequency but in relative phases to effect demodulation of the $-(R-Y)$ control signal at the emitter of transistor 141 and the $(B-Y)$ color control signal at the emitter of transistor 142. Thus, the $(R-Y)$ color control signal is developed across its collector resistor 144 and in an opposite phase in load 147, 148. Similarly, the $(B-Y)$ color control signal is developed across its emitter resistance in a positive sense and across its collector resistor 149 in an opposite phase. If resistors 144 and 145 of transistors 141 and 142 are properly adjusted in magnitude, the $(G-Y)$ color control signal is recovered in the common load circuit for these transistors. One disadvantage peculiar to this embodiment of the invention is that both transistors 141 and 142 are in an "on" condition for part of each cycle of the reference signal. This condition may result in cross-talk reaching the individual loads of each transistor. This condition is readily obviated, however, by reducing the duty cycle of each reference signal.

Although it has been assumed in the example just given the $-(R-Y)$ and $(B-Y)$ signal are selected for demodulation, this is not necessary; any combination of two of the three control signals may be detected and the third developed across the common load circuit by proper adjustment of the transistor load resistors. Furthermore, although the detector arrangement of FIGURE 2 which includes a pair of identical transistors as the basic elements of a functional block has only been described in the context of a stereo receiver, it will be recognized that this unit also finds application in a color receiver.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a receiver for responding to a composite signal including components within a given frequency band representing information and a suppressed-carrier amplitude-modulated subcarrier modulated by components in a second frequency band which at least partially overlaps said given frequency band and represents other information, a signal balanced synchronous detector comprising:

means for developing a reference signal having a frequency equal to that of said subcarrier;

two transistors each including a pair of primary electrodes and control electrode;

means for applying said composite signal and said reference signal as a common input between said control electrode and one of said primary electrodes of each of said transistors; and common load circuit means, coupled to the other of said primary electrodes of said transistors, for developing detected modulation components of substantially only said second frequency band.

2. The combination according to claim 1 in which said two transistors are complementary and each include emitter, base and collector electrodes and further in which said other of said primary electrodes consist of an emitter of one of said transistor and the collector of the other of said transistors.

3. The combination according to claim 2 and further including phase-splitting means coupled to said common load circuit means for developing said subcarrier modulation components in a positive and negative polarity.

4. The combination according to claim 3 in which the information of said given frequency band consists of the sum of two audio signals and in which the information of said second frequency band consists of the difference of said two audio signals and further including means for matrixing said audio sum signals with said positive and negative polarity difference signals to develop said two audio signals separate one from the other.

5. The combination according to claim 2 and further including a pair of load resistors and a cross-coupling resistors and in which said collector electrodes of said one transistor and said emitter electrode of said other transistor are individually coupled to a respective one of said load resistor and in which said cross-coupling resistor is connected between said collector electrode of said one transistor and said emitter electrode of said other transistor.

6. The combination according to claim 5 in which the information or said given frequency band consists of the sum of two audio signals and in which the information of said second frequency band consists of the difference of said two audio signals and further including indicator means coupled to said transistors in parallel with said common load circuit means for developing an indication in response to a signal in said passive load circuit.

7. The combination according to claim 1 in which said two transistors are of like gender and each including an emitter, base and collector electrode and further in which said other of said primary electrodes consists of said collector electrodes of said transistors.

8. In a color television receiver for responding to a composite signal including luminance components within a given frequency band and a suppressed-carrier amplitude-modulated subcarrier modulated with information which lies in a second frequency band at least partially overlapping said given frequency band and which information defines the hue and saturation of an image to be reproduced, a synchronous detector comprising:

a pair of complementary transistors each including an emitter, base and collector electrode;

means for developing a reference signal having a frequency equal to that of said subcarrier and for applying said reference signal in different, predetermined phases to said base electrodes of said complementary transistors;

means for applying at least those components of said composite signal falling within a third frequency band defined by said suppressed carrier amplitude-modulated subcarrier to said base electrodes of said complementary transistors;

means including individual load resistors for the collector electrode of one of said complementary transistors and for the emitter electrode of the other of said complementary transistors for respectively developing first and second different color control signals; and common load circuit means coupled to said emitter electrode of said one complementary transistor and to said collector electrode of said other complementary transistors for developing a third color control signal.

9. The combination according to claim 8 and further including individual amplifying means for said first, second and third color control signals with only said amplifiers for said first and second color control signals having a trap circuit for said reference signal.

10. In a color television receiver for responding to a received composite signal including video luminance components within a given frequency band and a suppressed-carrier amplitude-modulated subcarrier modulated with information collectively defining the hue and saturation of an image to be reproduced and which information occupies a second frequency band at least partially overlapping said given band, a synchronous detector for said suppressed-carrier information comprising:

first and second pairs of complementary transistors each including emitter, base and collector electrodes;

means for applying at least those frequency components lying in a third frequency band defined by the sidebands of said modulated subcarrier to said base electrodes of said first and second pair of complementary transistors;

means for applying said reference signal to said base electrodes of said first pair of complementary transistors in a first predetermined phase and to said base electrodes of said second pair of said complementary transistors in a second, different phase; and first and second load circuit means, coupled to said emitter electrode of said one tiansistor of each of said pairs of transistor and to said collector electrode of its corresponding complementary transistor, for developing first and second secondary color control signals.

11. The combination according to claim 10 and further including a matrix for developing first, second and third primary color control signals from said first and second secondary control signals.

References Cited

UNITED STATES PATENTS 3,258,537 6/1966 Proctor -------------- 179—15

KATHLEEN H. CLAFFY, Primary Examiner

B. P. SMITH, Assistant Examiner

U.S. Cl. X.R.

328—133